(12) United States Patent
Selby (10) Patent No.: US 10,741,213 B1
(45) Date of Patent: Aug. 11, 2020

(54) SYSTEMS AND METHODS FOR MODIFYING VIDEO EDITS

(71) Applicant: GoPro, Inc., San Mateo, CA (US)

(72) Inventor: James Selby, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 43 days.

(21) Appl. No.: 15/909,524

(22) Filed: Mar. 1, 2018

(51) Int. Cl.
 *G11B 27/028* (2006.01)
 *G11B 27/10* (2006.01)
 *G11B 27/36* (2006.01)

(52) U.S. Cl.
 CPC ............ *G11B 27/028* (2013.01); *G11B 27/10* (2013.01); *G11B 27/36* (2013.01)

(58) Field of Classification Search
 USPC ........................................................ 386/278
 See application file for complete search history.

(56) References Cited

U.S. PATENT DOCUMENTS

| 10,088,983 B1* | 10/2018 | Qaddoura | H04N 21/23439 |
| 10,121,187 B1* | 11/2018 | Nair | G06Q 30/0643 |
| 2016/0012857 A1* | 1/2016 | Leppanen et al. | G11B 27/32 386/241 |
| 2016/0092561 A1* | 3/2016 | Liu | G06F 16/739 386/230 |
| 2017/0110151 A1* | 4/2017 | Matias | G11B 27/031 |
| 2017/0272818 A1* | 9/2017 | Gattis | H04N 21/45452 |
| 2018/0020243 A1* | 1/2018 | Ni | H04N 21/2187 |

* cited by examiner

*Primary Examiner* — Loi H Tran
(74) *Attorney, Agent, or Firm* — Esplin & Associates, PC (57) ABSTRACT

Video edit information, video modification information, and/or other information may be obtained. Video edit information may define a video edit of video content. Video edit may include one or more portions of the video content and may have a progress length. Video modification information may define one or more criteria for modifying the video edit. One or more portions of the video edit may be identified based on the video modification information. The portion(s) of the video edit may be modified based on the video modification information. A revised video edit information may be generated. The revised video edit information may define a revised video edit of the video content. The revised video edit may include the portion(s) of the video edit modified based on the video modification information. The revised video edit may have a progress length shorter than the progress length of the video edit.

16 Claims, 5 Drawing Sheets

SYSTEMS AND METHODS FOR MODIFYING VIDEO EDITS

FIELD

This disclosure relates to modifying video edits based on video modification information.

BACKGROUND

A video edit may include one or more portions of video content. Modifying the video edit to include different (e.g., shorter) portions of the video content may be difficult and/or time consuming.

SUMMARY

This disclosure relates to modifying video edits. Video edit information, video modification information, and/or other information may be obtained. The video edit information may define a video edit of video content. The video edit may include one or more portions of the video content. The video edit may have a first progress length.

The video modification information may define one or more criteria for modifying the video edit. One or more portions of the video edit to be modified may be identified based on the video modification information and/or other information. The one or more portions of the video edit may be modified based on the video modification information and/or other information. A revised video edit information may be generated. The revised video edit information may define a revised video edit of the video content. The revised video edit may include the one or more portions of the video edit modified based on the video modification information. The revised video edit may have a second progress length shorter than the first progress length.

A system that modifies video edits may include one or more electronic storage, processor and/or other components. The electronic storage may store video edit information defining a video edit of video content, video modification information defining one or more criteria for modifying the video edit, and/or other information.

Video content may refer to media content that may be consumed as one or more videos. Video content may include one or more videos/video clips stored in one or more formats/containers, and/or other video content. Video content may have a progress length. Video content may define visual content viewable as a function of progress through the progress length of the video content. Visual content of the video content may be included within video frames of the video content.

The processor(s) may be configured by machine-readable instructions. Executing the machine-readable instructions may cause the processor(s) to facilitate modifying video edits. The machine-readable instructions may include one or more computer program components. The computer program components may include one or more of a video edit information component, a video modification information component, an identification component, a modification component, a revised video edit component, and/or other computer program components.

The video edit information component may be configured to obtain video edit information and/or other information. The video edit information may define a video edit of video content. The video edit may include one or more portions of the video content. The video edit may have a given progress length. In some implementations, the video edit may include one or more transitions between multiple portions of the video content. For example, the video edit may include a given transition between a first portion and a second portion of the video content.

The video modification information component may be configured to obtain video modification information and/or other information. The video modification information may define one or more criteria for modifying the video edit.

The identification component may be configured to identify one or more portions of the video edit to be modified based on the video modification information and/or other information. The portion(s) of the video edit identified may include those portions which may be shortened to decrease the progress length of the video edit. In some implementations, the portion(s) of the video edit may be identified further based on metadata characterizing the video content. In some implementations, the metadata characterizing the video content may include a saliency measure of an activity, an event, an object, a scene, and/or other information captured within the video content. In some implementations, the metadata characterizing the video content may be generated with a capture of the video content. In some implementations, the metadata characterizing the video content may be generated after the capture of the video content.

The modification component may be configured to modify one or more portions of the video edit based on the video modification information and/or other information. In some implementations, modification of one or more portions of the video edit may include removal of a segment of the video edit and/or an increase in a playback rate of the segment of the video edit. In some implementations, modification of one or more portions of the video edit may include replacement of a segment of the video edit with a portion of the video content not included in the video edit.

In some implementations, one or more portions of the video edit may be further modified based on one or more transitions included within the video edit. For example, the video edit may include a given transition between a first portion and a second portion of the video content, and the modification of the first portion may include increasing a playback rate of a first segment of the first portion and preserving the playback rate of a second segment of the first portion. The second segment may be adjacent to the given transition.

The revised video edit component may be configured to generate revised video edit information and/or other information. The revised video edit information may define a revised video edit of the video content. The revised video edit may include the one or more portions of the video edit modified based on the video modification information and/or other information, and/or other portions of the video edit. The revised video edit may have a progress length shorter than the given progress length of the video edit. In some implementations, the progress length of the revised video edit may be determined based on a length of a musical track providing accompaniment for the revised edit and/or other information. For example, the revised video edit may be synchronized to the musical track.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
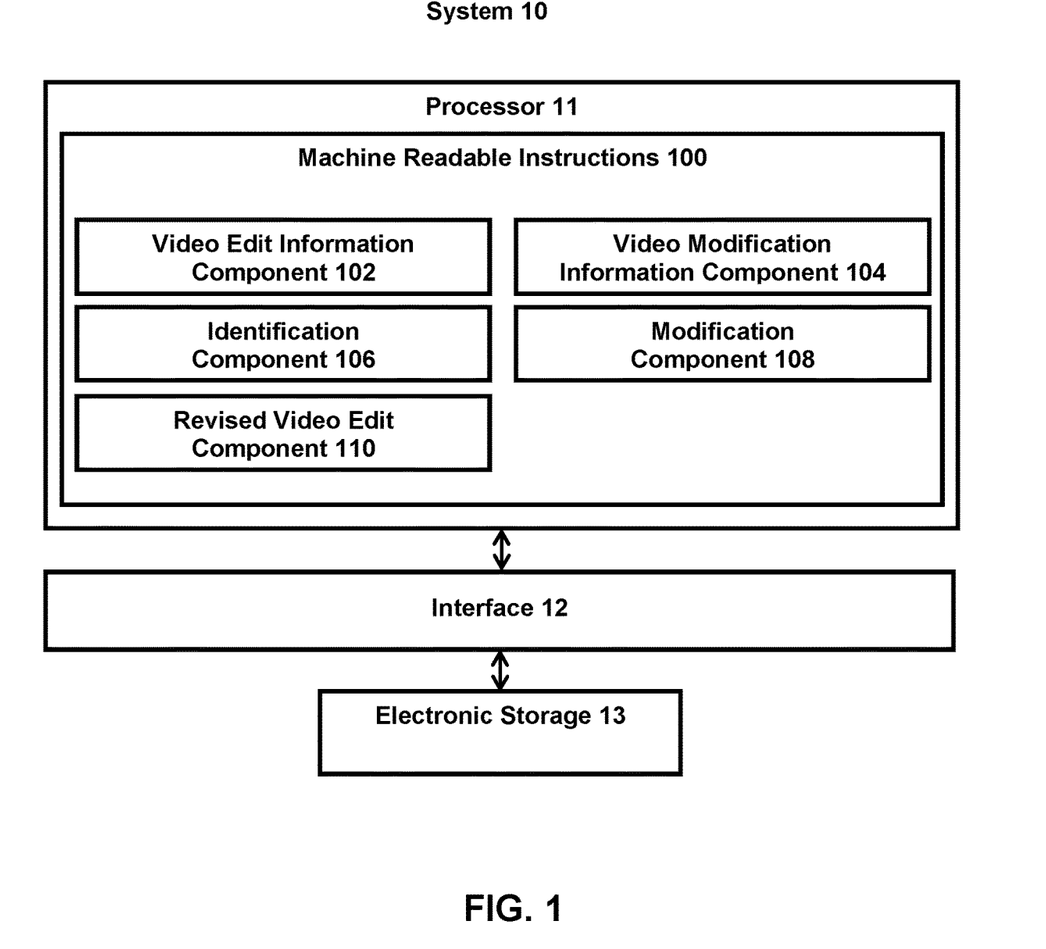
FIG. 1 illustrates a system that modifies video edits.

FIG. 1 illustrates a system 10 for modifying video edits. The system 10 may include one or more of a processor 11, an interface 12 (e.g., bus, wireless interface), an electronic storage 13, and/or other components. Video edit information, video modification information, and/or other information may be obtained by the processor 11. The video edit information may define a video edit of video content. The video edit may include one or more portions of the video content. The video edit may have a first progress length. The video modification information may define one or more criteria for modifying the video edit. One or more portions of the video edit to be modified may be identified based on the video modification information and/or other information. The one or more portions of the video edit may be modified based on the video modification information and/or other information. A revised video edit information may be generated. The revised video edit information may define a revised video edit of the video content. The revised video edit may include the one or more portions of the video edit modified based on the video modification information. The revised video edit may have a second progress length shorter than the first progress length.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to video information defining video content, video content, video edit information defining a video edit of video content, a video edit of video content, video modification information defining one or more criteria for modifying a video edit, one or more criteria for modifying a video edit, and/or other information.

For example, the electronic storage 13 may store video edit information defining a video edit of video content, video modification information defining one or more criteria for modifying the video edit, and/or other information. Video content may refer to media content that may be consumed as one or more videos/video clips. Video content may include one or more videos/video clips stored in one or more formats/containers, and/or other video content. A format may refer to one or more ways in which the information defining video content is arranged/laid out (e.g., file format). A container may refer to one or more ways in which information defining video content is arranged/laid out in association with other information (e.g., wrapper format). Video content may include a video clip captured by a video capture device, multiple video clips captured by a video capture device, and/or multiple video clips captured by different video capture devices. Video content may include multiple video clips captured at the same time and/or multiple video clips captured at different times. Video content may include a video clip processed by a video application, multiple video clips processed by a video application, and/or multiple video clips processed by different video applications.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other progress lengths, time durations, and frame numbers are contemplated.

Video content may define visual content viewable as a function of progress through the progress length of the video content. Visual content of the video content may be included within video frames of the video content. In some implementations, video content may include one or more spherical video content, virtual reality content, and/or other video content. Spherical video content and/or virtual reality content may define visual content viewable from a point of view as a function of progress through the progress length of the spherical video/virtual reality content.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate modifying video edits. The machine-readable instructions 100 may include one or more computer program components. The machine-readable instructions 100 may include one or more of a video edit information component 102, a video modification information component 104, an identification component 106, a modification component 108, a revised video edit component 110, and/or other computer program components.

The video edit information component 102 may be configured to obtain video edit information and/or other information. Obtaining video edit information may include one or more of accessing, acquiring, analyzing, determining, examining, loading, locating, opening, receiving, retrieving, reviewing, storing, and/or otherwise obtaining the video edit information. The video edit information component 102 may obtain video edit information from one or more locations. For example, the video edit information component 102 may obtain video edit information from a storage location, such as the electronic storage 13, electronic storage of a device accessible via a network, and/or other locations.

In some implementations, the video edit information may be obtained based on user interaction with a user interface/application (e.g., video editing application), and/or other information. For example, a user interface/application may provide option(s) for a user to select one or more video edits for modification. Video edit information defining a video edit may be obtained based on the user's selection of the video edit through the user interface/video application.

The video edit information may define a video edit of video content. A video edit of video content may refer to a particular arrangement and/or manipulation of one or more portions of video content. A video edit may include one or more portions of the video content. A video edit of video content may include a smaller portion of the video content or the entirety of the video content. The video content may include a single video clip or multiple video clips. For example, a video edit of video content may include arrangement/manipulation of a single video clip or may include arrangement/manipulation of multiple video clips into a single presentation. A video edit of video content may be generated based on a user's arrangement and/or manipulation of video content and/or may be automated generated by a computing device based on one or more video editing criteria.

The video edit may have a given progress length, defined in terms of time durations and/or frame numbers. The given progress length of the video edit may be the same as the progress length of the video content or different (e.g., shorter, longer) than the progress length of the video content. In some implementations, the video edit may include one or more transitions between multiple portions of the video content. A transition may refer to a portion of the video edit where the content of the video edit changes from one portion of the video content to a non-contiguous portion of the video content. For example, a video edit may include an arrangement of two separate video clips, and the two video clips may be joined in the video edit by a transition. As another example, a video edit may include two non-adjacent portions of a video clip and the two non-adjacent portions may be joined in the video edit by a transition. A transition in a video edit may or may not include a transition effect. A transition effect may refer to a visual effect that modifies visual characteristics of the video edit at/around a transition. For example, a transition that does not include a transition effect may include a moment in a video edit where the content of the video edit simply switches from a given video clip to another video clip. A transition that includes a transition effect may include a moment in a video edit where the content of the video edit is modified so that the switch from a given video clip to another video clip is accomplished with a visual effect (e.g., crossfade, fade-to-black, fade-from-black, dissolve, swipe, and fly-in).

Figure 3:
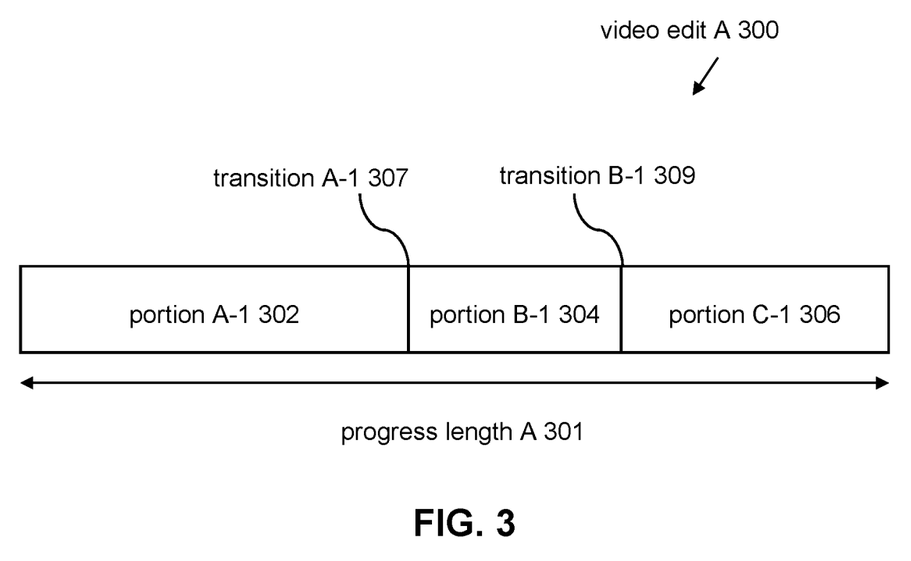
FIG. 3 illustrates an example video edit.

FIG. 3 illustrates an example video edit A 300. The video edit A 300 may be defined by video edit information. The video edit A 300 may have a progress length A 301. The video edit A 300 may include three portions of video content: a portion A-1 302, a portion B-1 304, and a portion C-1 306. The portion A-1 302 and the portion B-1 304 may be joined in the video edit A 300 by a transition A-1 307. The portion B-1 304 and the portion C-1 306 may be joined in the video edit A 300 by a transition B-1 309. The video edit information defining the video edit A 300 may define an encoded video content and/or instructions for rendering video content. The video edit information may define an encoded version of the video edit A 300, and the video edit information (e.g., video file) may be opened in a video player for presentation. The video edit information may define instructions identifying arrangement and/or manipulation of one or more portions of video content included in the video edit A 300. For example, the video information may define a director track that includes information as to which portions of the video content (e.g., the portion A-1 302, the portion B-1 304, the portion C-1 306) are included in the video edit A 300 and the order in which the portions are to the presented on playback. The instructions may define one or more effects (e.g., transition effects) to be used during playback. A video player may use the director track to retrieve the included portions of the video content when the video edit A 300 is opened/to be presented.

Referring back to FIG. 1, the video modification information component 104 may be configured to obtain video modification information and/or other information. Obtaining video modification information may include one or more of accessing, acquiring, analyzing, determining, examining, loading, locating, opening, receiving, retrieving, reviewing, storing, and/or otherwise obtaining the video modification information. The video modification information component 104 may obtain video modification information from one or more locations. For example, the video modification information component 104 may obtain video modification information from a storage location, such as the electronic storage 13, electronic storage of a device accessible via a network, and/or other locations.

In some implementations, the video modification information may be obtained based on user interaction with a user interface/application (e.g., video editing application), and/or other information. For example, a user interface/application may provide option(s) for a user to select one or more criteria for modifying a video edit. The video modification information defining one or more criteria may be obtained based on the user's selection of the one or more criteria through the user interface/video application.

The video modification information may define one or more criteria for modifying a video edit. A criterion for modifying a video edit may refer to one or more rules by which the video edit may be modified. For example, a criterion for modifying a video edit may include one or more rules by which the progress length of the video edit may be changed (e.g., decreased, increased). A criterion for modifying a video edit may be static for the entirety of the video edit or dynamic with respect to the progress length of the video edit. For example, a criterion for modifying a video edit may use the same rule to modify the entirety of the video edit or may use different rules to modify different portions of the video edit. For example, a criterion for modifying a video edit may use a given set of rules for modifying an introductory portion of the video edit while using a different set of rules for modifying a middle portion and/or an ending portion of the video edit.

A criterion for modifying a video edit may include one or more rules by which portions of the video edit may be identified for modification. The rule(s) by which portions of the video edit may be identified may use visual characteristics of the video edit, non-visual characteristics of the video edit, and/or other information. Visual characteristics of the video edit may refer to features and/or qualities of the visuals within the video edit. For example, visual characteristics of the video edit may refer to identification of one or more activities, one or more events, one or more objects, one or more scenes, and/or other content captured with the portions of the video content included in the video edit. Visual characteristics of the video edit may refer to quality of images included within the video edit, such as image resolution, colors, brightness, contrast, sharpness, blurriness, shakiness, stability, and/or other characteristics of the portions of the video content included in the video edit.

Non-visual characteristics of the video edit may refer to non-visual features and/or qualities that characterize the content within the video edit. Non-visual characteristics of the video edit may be determined based on analysis of data (e.g., metadata) captured with the video content and/or data generated to characterize the nature of the video content. For example, non-visual characteristics of the video edit may include information relating to audio captured with the video content, motion of image capture device(s) that captured the video content, shakiness of the image capture device(s) that captured the video content, the time of capture of the video content, the season of capture of the video content, the location of capture of the video content. Non-visual characteristics of the video edit may be determined from information generated by non-image sensors. For example, readings from motion sensors (e.g., accelerometer, inertial measurement unit) may be used to determine that a user of a video content (e.g., a user captured within the video content, a user capturing the video content with an image capture device) is engaged in a particular type of activity (e.g., skiing, surfing) and/or that the user is experiencing a particular type of event during the activity (e.g., jumping, falling). Such information may characterize the video content included in the video edit.

In some implementations, the visual characteristics and/or the non-visual characteristics of the video edit may be used to determine metadata for the video edit. For example, the visual characteristics and/or the non-visual characteristics of the video edit may be used to provide for a saliency measure of the video edit. A saliency measure may refer to one or more measurements indicating whether portions of the video content included in the video edit include capture of visuals that are of interest to one or more users. A saliency measure may depend on identification activities, events, objects, scenes, and/or other content captured within the video content. A saliency measure may depend on the quality of images included within the video content. A saliency measure may depend on non-visual features/qualities that characterize the video content. A saliency measure may be measured in numbers, characters, and/or other measurements. A saliency measure may be generic or specific to particular users.

For example, a saliency measure may indicate a probability that portions of the video content include a visual capture of a particular object, a particular scene, a particular action, and/or other information. For instance, a saliency measure may indicate a probability that a portion of the video content includes a particular person, a particular sporting activity/movement, a particular emotion (e.g., laughing, smiling, excited), and/or other information. Other probabilities are contemplated.

A saliency measure may indicate one or more measurements of one or more characteristics of the portions of the video content that quantifies user interest. For example, a saliency measure may indicate measurement(s) of intensities of visuals and/or audios captured within the portions, activities/events captured within the portions, and/or other information. Other measurements are contemplated.

A criterion for modifying a video edit may include one or more rules by which the identified portions of the video edit may be modified. Modification of the identified portions may include changes in playback rates of the video portions, removal of the video portions from the video edit, replacement of the video portions within the video edit, and/or other modifications to the identified portions. For example, a criterion for modifying a video edit may use a saliency measure to determine which portions of the video edit may be sped-up/sped-down, removed from the video edit, and/or replaced with other video content. For instance, a criterion for modifying a video edit may prioritize smiling faces or shots of scenery and provide for speeding-up/removal of portions including shots of scenery while retaining portions including smiling faces. A criterion for modifying a video edit may priority action shots or still shots and provide for speeding-up/removal of portions including stationary shots (e.g., wading during surfing activity) while slowing-down during action shots (e.g., standing up during surfing activity, riding a wave during surfing activity). Such modification of a video edit may provide for automatic speeding-up of video clip(s) included in the video edit to reduce the overall length of the video clip while slowing down during the interesting portions of the video edit based on image and metadata analysis. For example, such modification of a video edit may provide for automatic speeding-up of video clip(s) included in the video edit while slowing down during highlight moments.

In some implementations, different video modification information may be used for based on the video edit and/or other information. Video modification information component 104 may obtain different criteria for modifying a video edit based on what is included within the video edit (e.g., activity, event, object, scene included in the video edit), the length of the video edit, music accompanying the video edit, and/or other information. For example, video modification information component 104 may obtain different criteria for a video edit containing one or more portions of a hiking activity than for a video edit containing one or more portions of a skating activity. The video modification information component 104 may obtain different criteria for a video edit being accompanied by an upbeat soundtrack than a video edit being accompanied by a relaxing soundtrack.

The identification component 106 may be configured to identify one or more portions of the video edit to be modified based on the video modification information and/or other information. The portion(s) of the video edit identified may include those portions which may be shortened to decrease the progress length of the video edit. In some implementations, the identification of the portions of the video edit may include identification of portions which are to be lengthened/slowed down.

The identification component 106 may use one or more criteria defined by the video modification information to identify portion(s) of the video edit for modification. For example, the identification component 106 may match one or more rules in a given criteria to particular visual characteristics and/or particular non-visual characteristics of the video content. For instance, the identification component 106 may match one or more rules in a given criteria to a saliency measure of an activity, an event, an object, a scene, and/or other information captured within the video content.

For instance, the identification component 106 may identify portions of a video edit including smiling faces for preservation and identify portions of the video edit including shots of scenery for speeding-up/removal. The identification component 106 may identify portions of the video edit including action shots for preservation/slowing-down and identify portions of the video edit including still shots for speeding-up/removal. For example, a video edit may include a first-person point of view shots of a biking trip in which a user carrying a camera rides through a forest, rides along a cliff, and performs jumps/tricks. The identification component 106 may identify portions including the ride through the forest for speeding-up, identify portions including the ride along a cliff for preservation or different speeding-up than the ride through the forest (e.g., based on a user preference for shots along cliffs overs shots through forests), and identify portions of the person performing jumps/tricks for preservation/slowing-down. The identification component 106 may identify such portions based on visual characteristics and/or non-visual characteristics of the video edit characterizing the portions. The identification component 106 may identify such portions based on a saliency measure and/or other information. Use of other metadata characterizing video content (e.g., generated with capture of the video content, generated after capture of the video content) are contemplated.

The modification component 108 may be configured to modify one or more portions of the video edit based on the video modification information and/or other information. Modification of the video edit based on the video modification information may include modification of the portion(s) of the video edit identified based on the video modification information, modification of the identified portion(s) using the modification information (modification information includes one or more rules by which the identified portion(s) of the video edit may be modified), and/or modification of the identified portion based on other information.

The modification of the video edit by the modification component 108 may result in the overall progress length of the video edit becoming shorter than the original progress length of the video edit. In some implementations, modification of one or more portions of the video edit may include removal of a segment of the video edit and/or an increase in a playback rate of the segment of the video edit. A playback rate of a video edit may refer to the perceived speed with which the video content included in the video edit is presented on playback (e.g., regular speed, half speed, double speed). For example, the modification component 108 may modify a given portion of the video edit by removing one or more video frames corresponding to a segment of the given portion and/or by increasing the speed with which the segment of the given portion is played. In some implementations, modification of the video edit may include slowing-down of one or more portions of the video edit (e.g., slowing down during interesting moments within the video edit) while removing/speeding up other portions of the video edit to reduce the overall length of the video edit. Such modification of the video edit may create a revised video edit based on removal of certain type of content, trimming down playback times, and/or removal of video frames from the video edit based on particular visual characteristics and/or non-visual characteristics of the video content to create a shorter version of the video edit without reducing the quality of the video edit.

In some implementations, the modification component 108 may modify one or more portions of the video edit by replacing of a segment of the video edit with a portion of the video content not included in the video edit. For example, the video content from which the video edit was made may include three video clips, and the original video edit may have included two out of the three video clips. The modification component 108 may modify the video edit to replace one or more segments of the two video clips included in the video edit with one or more segments of the third video clip originally not included in the video edit.

Figure 4A:
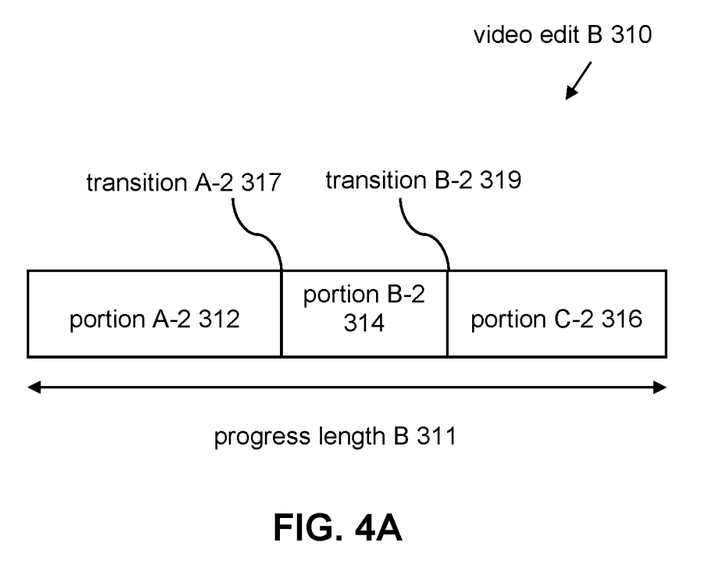
FIGS. 4A-4C illustrate example revised video edits.
Figure 4B:
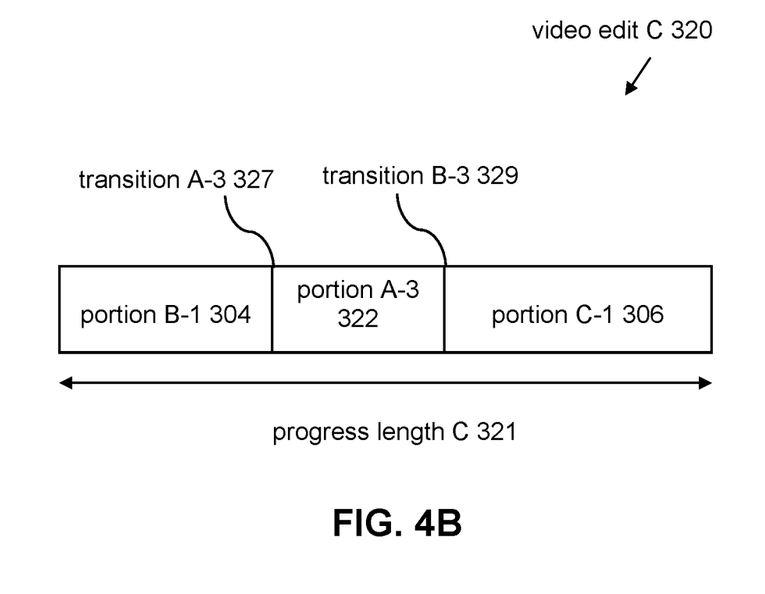
Figure 4C:
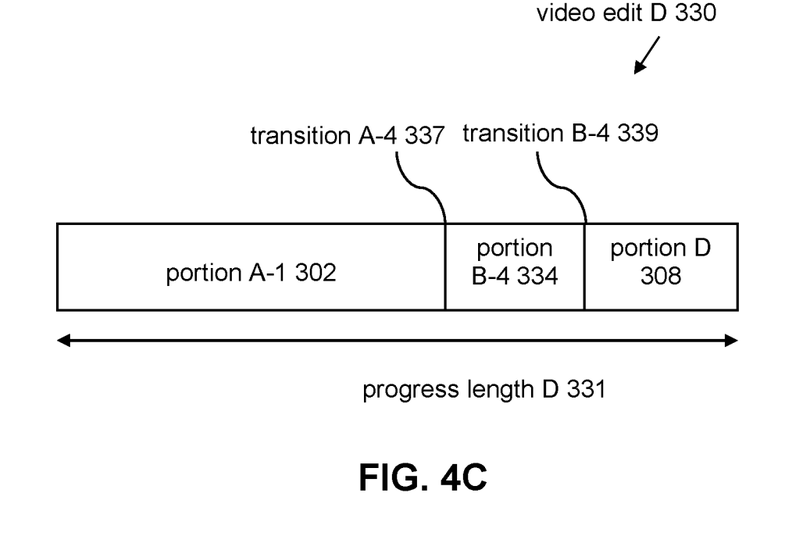

FIGS. 4A-4C illustrate example revised video edits 310, 320, 330. The video edit B 310 (shown in FIG. 4A) may be created based on modification of the video edit A 300 (shown in FIG. 3). The video edit B 310 may be created based on the following changes: the length of the portion A-1 302 may be shortened to a portion A-2 312; the length of the portion B-1 304 may be shortened to a portion B-2 314, and the length of the portion C-1 306 may be shortened to a portion C-2 316. The portion A-2 312 may be joined to the portion B-2 314 by a transition A-2 317, and the portion B-2 314 may be joined to the portion C-2 316 by a transition B-2 319. The video edit B 310 may have a progress length B 311 shorter than the progress length A 301. The amounts by which the portions 302, 304, 306 are shortened (e.g., based on removal of content/video frames, change in playback rates) may be based on content/quality of content included within the individual portions 302, 304, 306. For example, rather than shortening the portions 302, 304, 306 by the same amount (e.g., 3 seconds, 10%), the portions 302, 304, 306 may be individually shortened based on the amount and type of interesting content included within the portions 302, 304, 306. As another example, different rules may be used to modify the portions 302, 304, 306 such that a particular portion (e.g., the beginning portion, the middle portion, the ending portion) is more aggressively shrunk than other portion(s).

The video edit C 320 (shown in FIG. 4B) may be created based on modification of the video edit A 300 (shown in FIG. 3). The video edit C 320 may be created based on the following changes: the length of the portion A-1 302 may be shortened to a portion A-3 322 and the portion A-3 322 may be moved to the middle of the video edit C 320; the length of the portion B-1 304 may be preserved and the portion B-1 304 may be moved to the beginning of the video edit C 320, and the length of the portion C-1 306 may be preserved. The portion B-1 304 may be joined to the portion A-3 322 by a transition A-3 327, and the portion A-3 322 may be joined to the portion C-1 306 by a transition B-3 329. The video edit C 320 may have a progress length C 321 shorter than the progress length A 301. In some implementations, the rearrangement of the video portions in the video edit C 320 may allow for the video edit C 320 to be better synchronized to accompanying soundtrack(s) than if the arrangement of the video portions were left unchanged.

The video edit D 330 (shown in FIG. 4C) may be created based on modification of the video edit A 300 (shown in FIG. 3). The video edit D 330 may be created based on the following changes: the length of the portion A-1 302 may be preserved; the length of the portion B-1 304 may be shortened to a portion B-4 334, and the portion C-1 306 may be replaced with a portion D 308. The portion A-1 302 may be joined to the portion B-4 3334 by a transition A-4 337, and the portion B-4 334 may be joined to the portion D 308 by a transition B-4 339. The portion D 308 may include a portion of video content not included in the video edit A 300. The video edit D 330 may have a progress length D 331 shorter than the progress length A 301.

Figure 5:
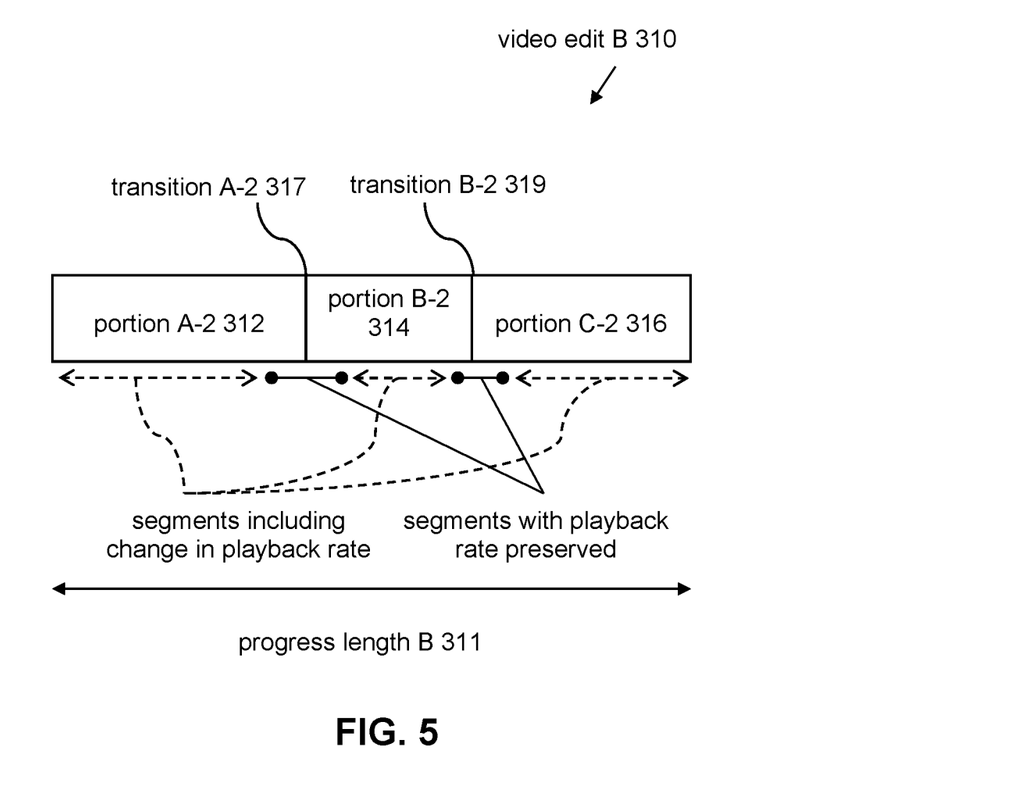
FIG. 5 illustrates example changes in playback rates based on transitions in a video edit.

In some implementations, one or more portions of the video edit may be modified based on one or more transitions included within the video edit. For example, referring to FIG. 5, the video edit B 310 may include the transition A-2 317 between the portion A-2 312 and the portion B-2 314, and the transition B-2 319 between the portion B-2 314 and the portion C-2 316. The modification of the video edit A 300 to the video edit B 310 may include change (e.g., increase) in playback rates of segments of the portion A-2 312, the portion B-2 314, and the portion C-2 316. The playback rates of segments of the portion A-2 312 and the portion B-2 314 adjacent to each other/transition A-2 317 may be preserved and the playback rates of segments of the portion B-2 314 and the portion C-2 316 adjacent to each other/transition B-2 319 may be preserved. Such changes and preservation of the playback rates of the segments of the revised video edit may provide for distinct viewing experience of different video portion included in the view edit. For instance, if the playback rates of segments of the video edits adjacent to transition moments are sped-up, then a user viewing the revised video edit may not realize/may have a hard time realizing that the revised video edit has transitioned between different portions of video content (e.g., transitioned from showing shots from a particular video clip to shots of a different video clip). By preserving the playback rates of segments of the video edits adjacent to the transitions, a user may be able to better experience the transitions contained within the revised video edit and the playback of the revised video edit may provide the same/similar transition experience as the original video edit.

Referring back to FIG. 1, the revised video edit component 110 may be configured to generate revised video edit information and/or other information. The revised video edit information may define a revised video edit of the video content. The revised video edit may include the one or more portions of the video edit modified based on the video modification information and/or other information, and/or other portions of the video edit. The revised video edit may have a progress length shorter than the given progress length of the video edit. In some implementations, the progress length of the revised video edit may be determined based on a length of a musical track (e.g., a soundtrack) providing accompaniment for the revised edit and/or other information. For example, the revised video edit may be synchronized to the musical track and the length of the revised video edit may be determined to match the length of the musical track.

The revised video edit information may define an encoded video content of the revised video edit and/or instructions for rendering the video content of the revised video edit. For example, the revised video edit information may define an encoded version of a particular revised video edit, and the revised video edit information (e.g., video file) may be opened in a video player for presentation. The revised video edit information may define instructions identifying arrangement and/or manipulation of one or more portions of video content included in the revised video edit. For example, the revised video information may define a director track that includes information as to which portions of the video content are included in the revised video edit and the order in which the portions are to the presented on playback. The instructions may define one or more effects (e.g., transition effects) to be used during playback. A video player may use the director track to retrieve the portions of the video content included in the revised video edit when the revised video edit is opened/to be presented.

The revised video edit component 110 may be configured effectuate storage of the revised video edit information and/or other information in one or more storage media. For example, the revised video information may be stored in the electronic storage 13, remote storage locations (storage media located at/accessible through a server), and/or other locations. In some implementations, the revised video edit component 110 may effectuate storage of the revised video information through one or more intermediary devices. For example, the processor 11 may be located within a computing device without a connection to the storage device (e.g., the computing device lacks WiFi/cellular connection to the storage device). The revised video edit component 110 may effectuate storage of the revised video edit information through another device that has the necessary connection (e.g., the computing device using a WiFi/cellular connection of a paired mobile device, such as a smartphone, tablet, laptop, to store information in one or more storage media). Other storage locations for and storage of the revised video information are contemplated.

Spherical video content may refer to a video capture of multiple views from a location. Spherical video content may include a full spherical video capture (360 degrees of capture, including opposite poles) or a partial spherical video capture (less than 360 degrees of capture). Spherical video content may be captured through the use of one or more cameras/image sensors to capture images/videos from a location. Spherical video content may be generated based on light received within a field of view of a single image sensor or within fields of view of multiple image sensors during a capture period. For example, multiple images/videos captured by multiple cameras/image sensors may be combined/stitched together to form the spherical video content. The field of view of camera(s)/image sensor(s) may be moved/rotated (e.g., via movement/rotation of optical element(s), such as lens, of the image sensor(s)) to capture multiple images/videos from a location, which may be combined/stitched together to form the spherical video content.

Visual content of the spherical video content may be included within spherical video frames of the spherical video content. For example, multiple images captured by multiple cameras/images sensors at a moment in time may be combined/stitched together to form a spherical video frame for the moment in time. A spherical video frame may include a full spherical image capture (360 degrees of capture, including opposite poles) or a particular spherical image capture (less than 360 degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

In some implementations, spherical video content may be stored with a 5.2K resolution. Using a 5.2K spherical video content may enable viewing windows (e.g., directed to a portion of a spherical video frame) for the spherical video content with a resolution close to 1080p. In some implementations, spherical video content may include 12-bit video frames. In some implementations, spherical video content may be consumed as virtual reality content.

Virtual reality content may refer to content (e.g., spherical video content) that may be consumed via virtual reality experience. Virtual reality content may associate different directions within the virtual reality content with different viewing directions, and a user may view a particular direction within the virtual reality content by looking in a particular direction. For example, a user may use a virtual reality headset to change the user's direction of view. The user's direction of view may correspond to a particular direction of view within the virtual reality content. For example, a forward-looking (e.g., north) direction of view for a user may correspond to a forward (e.g., north) direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

While the description herein may be directed to video content, one or more other implementations of the system/ method described herein may be configured for other types media content. Other types of media content may include one or more of audio content (e.g., music, podcasts, audiobooks, and/or other audio content), multimedia presentations, images, slideshows, visual content (e.g., one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
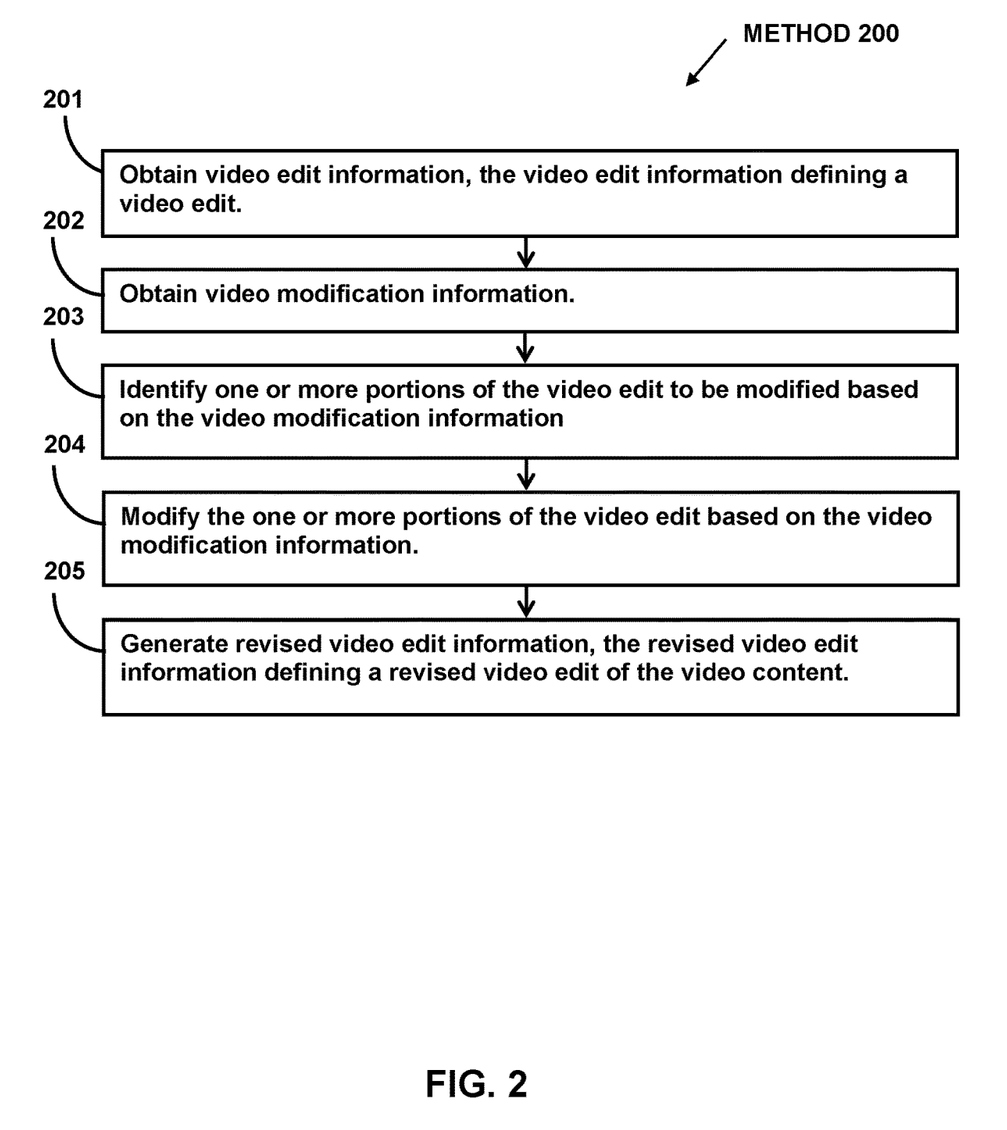
FIG. 2 illustrates a method for modifying video edits.

FIG. 2 illustrates method 200 for modifying video edits. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video edit information may be obtained. The video edit information may define a video edit. The video edit may include one or more portions of the video content. The video edit may have a first progress length. In some implementation, operation 201 may be performed by a processor component the same as or similar to the video edit information component 102 (Shown in FIG. 1 and described herein).

At operation 202, video modification information may be obtained. The video modification information may define one or more criteria for modifying the video edit. In some implementations, operation 202 may be performed by a processor component the same as or similar to the video modification information component 104 (Shown in FIG. 1 and described herein).

At operation 203, one or more portions of the video edit to be modified may be identified based on the video modification information. In some implementations, operation 203 may be performed by a processor component the same as or similar to the identification component 106 (Shown in FIG. 1 and described herein).

At operation 204, the one or more portions of the video edit may be modified based on the modification information. In some implementations, operation 204 may be performed by a processor component the same as or similar to the modification component 108 (Shown in FIG. 1 and described herein).

At operation 205, a revised video edit information may be generated. The revised video edit information may define a revised video edit of the video content. The revised video edit may include the one or more portions of the video edit modified based on the video modification information. The revised video edit may have a second progress length shorter than the first progress length. In some implementations, operation 205 may be performed by a processor component the same as or similar to the revised video edit component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that modifies video edits, the system comprising:
one or more physical processors configured by machine-readable instructions to:
obtain video edit information, the video edit information defining a video edit of video content, the video edit including arrangement of multiple video clips into a single presentation, the video edit further including video transitions between the multiple video clips, wherein individual video transitions join different ones of the multiple video clips, the video edit including a first video clip and a second video clip, the first video clip joined to the second video clip via a first video transition, the first video transition including a transition effect, the transition effect including the video content edited in the video edit to provide a visual effect in switching between joined video clips, the visual effect including cross-fade, fade-to-black, fade-from-black, dissolve, swipe, or fly-in to switch between the joined video clips in the video edit, the video edit having a first progress length;
obtain video modification information, the video modification information defining one or more criteria for automatically modifying the video edit to generate a shorter video edit, the one or more criteria including one or more rules by which one or more of the multiple video clips in the video edit are identified for modification and one or more rules by which the one or more identified video clips are modified to shorten the video edit;
identify the one or more of the multiple video clips in the video edit to be modified based on the video modification information;
modify the one or more identified video clips in the video edit based on the video modification information and based on whether one or more of the video transitions joining the one or more identified video clips include or do not include the transition effect, wherein the first video clip and the second video clip are identified to be modified based on the video modification information and the first video transition including the transition effect, the one or more identified video clips in the video edit are modified to preserve timing of the one or more video transitions based on the one or more video transitions including the transition effect, the one or more rules by which the first video clip and the second video clip are modified to shorten the video edit including modifying playback rates of the first video clip and the second video clip based on the first video transition including the transition effect to preserve timing of the first video transition by increasing playback rates of segments of the first video clip and the second video clip non-adjacent to the first video transition while preserving playback rates of segments of the first video clip and the second video clip adjacent to the first video transition; and
generate revised video edit information, the revised video edit information defining a revised video edit of the video content, the revised video edit including the one or more identified video clips in the video edit modified based on the video modification information and based on whether the one or more of the video transitions joining the one or more identified video clips include or do not include the transition effect, the revised video edit having a second progress length shorter than the first progress length.

2. The system of claim 1, wherein the one or more of the multiple video clips in the video edit are identified further based on metadata characterizing the video content.

3. The system of claim 2, wherein the metadata characterizing the video content is generated with or after capture of the video content.

4. The system of claim 2, wherein the metadata characterizing the video content includes a saliency measure of an activity, an event, an object, and/or a scene captured within the video content.

5. The system of claim 1, wherein modification of the one or more identified video clips in the video edit based on the video modification information includes removal of at least one of the one or more identified video clips from the video edit.

6. The system of claim 1, wherein modification of the one or more identified video clips in the video edit based on the video modification information includes an increase in a playback rate of at least one of the one or more identified video clips of the video edit.

7. The system of claim 1, wherein modification of the one or more identified video clips in the video edit based on the video modification information includes replacement of an original video clip of the video edit with a new video clip, the new video clip having a shorter progress length than the original video clip, the new video clip including one or more portions of the video content not originally included within the video edit.

8. The system of claim 1, wherein:
the one or more identified video clips in the video edit are modified further based on synchronization to an accompanying soundtrack such that modification of the one or more identified video clips in the video edit includes changing order of at least one of the one or more identified video clips within the arrangement of video clips to improve synchronization to the accompanying soundtrack.

9. The system of claim 8, wherein:
the video edit includes a third video clip and a fourth video clip, the arrangement of the third video clip and the fourth video clip including the third video clip before the fourth video clip;
a length of the third video clip or the fourth video clip is shortened based on the video modification information; and
the arrangement of the third video clip and the fourth video clip is changed to include the fourth video clip before the third video clip based on the shortening of the length of the third video clip or the fourth video clip resulting in better synchronization to the accompanying soundtrack of the changed arrangement including the fourth video clip before the third video clip than the arrangement including the third video clip before the fourth video clip.

10. A method for modifying video edits, the method performed by a computer system including one or more processors comprising:
obtaining, by the computing system, video edit information, the video edit information defining a video edit of video content, the video edit including arrangement of multiple video clips into a single presentation, the video edit further including video transitions between the multiple video clips, wherein individual video transitions join different ones of the multiple video clips, the video edit including a first video clip and a second video clip, the first video clip joined to the second video clip via a first video transition, the first video transition including a transition effect, the transition effect including the video content edited in the video edit to provide a visual effect in switching between joined video clips, the visual effect including crossfade, fade-to-black, fade-from-black, dissolve, swipe, or fly-in to switch between the joined video clips in the video edit, the video edit having a first progress length;
obtaining, by the computing system, video modification information, the video modification information defining one or more criteria for automatically modifying the video edit to generate a shorter video edit, the one or more criteria including one or more rules by which one or more of the multiple video clips in the video edit are identified for modification and one or more rules by which the one or more identified video clips are modified to shorten the video edit;
identifying, by the computing system, the one or more of the multiple video clips in the video edit to be modified based on the video modification information;
modifying, by the computing system, the one or more identified video clips in the video edit based on the video modification information and based on whether one or more of the video transitions joining the one or more identified video clips include or do not include the transition effect, wherein the first video clip and the second video clip are identified to be modified based on the video modification information and the first video transition including the transition effect, the one or more identified video clips in the video edit are modified to preserve timing of the one or more video transitions based on the one or more video transitions including the transition effect, the one or more rules by which the first video clip and the second video clip are modified to shorten the video edit including modifying playback rates of the first video clip and the second video clip based on the first video transition including the transition effect to preserve timing of the first video transition by increasing playback rates of segments of the first video clip and the second video clip non-adjacent to the first video transition while preserving playback rates of segments of the first video clip and the second video clip adjacent to the first video transition; and
generating, by the computing system, revised video edit information, the revised video edit information defining a revised video edit of the video content, the revised video edit including the one or more identified video clips in the video edit modified based on the video modification information and based on whether the one or more of the video transitions joining the one or more identified video clips include or do not include the transition effect, the revised video edit having a second progress length shorter than the first progress length.

11. The method of claim 10, wherein the one or more of the multiple video clips in the video edit are identified further based on metadata characterizing the video content.

12. The method of claim 11, wherein the metadata characterizing the video content is generated with or after capture of the video content.

13. The method of claim 11, wherein the metadata characterizing the video content includes a saliency measure of an activity, an event, an object, and/or a scene captured within the video content.

14. The method of claim 10, wherein modification of the one or more identified video clips in the video edit based on the video modification information includes removal of at least one of the one or more identified video clips from the video edit.

15. The method of claim 10, wherein:
the one or more identified video clips in the video edit are modified further based on synchronization to an accompanying soundtrack such that modification of the one or more identified video clips in the video edit includes changing order of at least one of the one or more identified video clips within the arrangement of video clips to improve synchronization to the accompanying soundtrack.

16. The method of claim 15, wherein:
the video edit includes a third video clip and a fourth video clip, the arrangement of the third video clip and the fourth video clip including the third video clip before the fourth video clip;

a length of the third video clip or the fourth video clip is shortened based on the video modification information; and the arrangement of the third video clip and the fourth video clip is changed to include the fourth video clip before the third video clip based on the shortening of the length of the third video clip or the fourth video clip resulting in better synchronization to the accompanying soundtrack of the changed arrangement including the fourth video clip before the third video clip than the arrangement including the third video clip before the fourth video clip.

* * * * *